United States Patent [19]

Schmid

[11] 3,823,252

[45] *July 9, 1974

[54] CONDUCTING ELEMENT HAVING BUNDLED SUBSTANTIALLY PARALLEL CRYSTALLINE CONDUCTORS AND PROCESS FOR MANUFACTURE

[75] Inventor: Anthony P. Schmid, Riga, Mich.

[73] Assignee: Owens-Illinois, Inc., Toledo, Ohio

[ * ] Notice: The portion of the term of this patent subsequent to Sept. 11, 1990, has been disclaimed.

[22] Filed: Oct. 26, 1972

[21] Appl. No.: 301,235

[52] U.S. Cl. .................. 174/68.5, 29/625, 264/345, 313/73, 313/95, 317/101 B

[51] Int. Cl. .......................................... H05k 1/02

[58] Field of Search ........................ 174/68.5, 50.53; 317/101 CC, 101 B; 313/73, 95; 346/74; 29/592, 625; 264/345

[56] References Cited

UNITED STATES PATENTS

| | | | |
|---|---|---|---|
| 3,061,760 | 10/1962 | Ezzo | 174/68.5 X |
| 3,160,790 | 12/1964 | Mittler | 174/68.5 X |
| 3,321,657 | 5/1967 | Granitsas et al. | 313/73 |
| 3,366,817 | 1/1968 | Miller | 313/73 |
| 3,688,018 | 8/1972 | Hiscocks | 174/68.5 |

*Primary Examiner*—Darrell L. Clay
*Attorney, Agent, or Firm*—Howard G. Bruss, Jr.; Edward J. Holler

[57] ABSTRACT

Disclosed is a method for forming an array of conductive crystalline dendrites of reduced rutile in a glass-ceramic insulating matrix by crystallizing certain compositions containing titania and silica in a non-oxidizing atmosphere under the influence of a thermal gradient to form a parallel array of conductive reduced rutile dendrites. Several of such dendrites are joined to form a coaxial bundle (i.e., a bundle having substantially parallel conductors) through the matrix by means of conductive caps on opposing faces of the matrix.

14 Claims, 5 Drawing Figures

Figure 1:
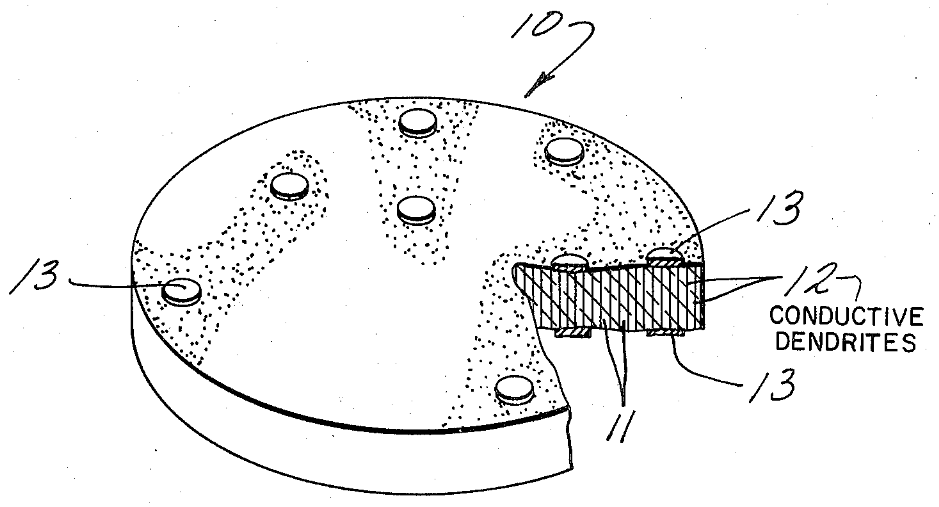

CONDUCTING ELEMENT HAVING BUNDLED SUBSTANTIALLY PARALLEL CRYSTALLINE CONDUCTORS AND PROCESS FOR MANUFACTURE

This application is related to commonly assigned co-pending U.S. application Ser. No. 289,193 filed Sept. 14, 1972 now U.S. Pat. No. 3,758,705 in the name of the same inventor, the disclosure of which is incorporated by reference.

There is a need in the electronics industry for a device comprising an insulating plate having embedded therein and passing therethrough an array of mutually insulated conductors. Such devices are used in the faceplates of cathode ray tubes and other electronic transmission systems where an interaction between an electronic charge generated in vacuum and processing equipment located in air is desired. General background for such applications is provided in U.S. Pat. Nos. 3,321,657; 3,193,364; 3,220,012; 3,424,932; 2,952,796; 3,140,528; and 3,366,817.

For such applications the device must be vacuum tight and this requirement has resulted in severe fabrication difficulties when conventional manufacturing techniques are employed. For instance when metal filaments are embedded in a glassy matrix the devices often have structural defects due to the difference in thermal expansion coefficients between the glassy matrix and the metal filaments. Moreover it is often difficult to achieve a vacuum-tight seal between the glassy matrix and the individual conductors.

One particularly important application of the present invention is an electron image transfer device as in the faceplate of a cathode-ray tube. In such a device the element having parallel conductors is sealed in the faceplate of a cathode-ray tube so that the ends of the conductors present a mosaic pattern upon which electronic information is imposed by means of the electron gun within the tube. The conductor ends which are in the cathode-ray tube each receive an electronic charge which is then transmitted outside the faceplate and can be used for reproduction or display purposes.

An image transfer device of this type must incorporate a very large number of relatively small diameter conductors which are spaced and insulated from one another, in order to provide adequate optical resolution for electron charge information thus transmitted. Furthermore, the device must have sufficient strength so that a relatively thin section can serve as a cathode-ray tube faceplate and the individual conductors must be vacuum tight within the insulating matrix to provide for the maintenance of a prolonged vacuum.

To accomplish these objectives, the prior art has proposed various methods of binding as assemblage of short wires or other conductors together with an insulating matrix. This has often proven to be unreliable or economically impractical for many commercial applications.

In co-pending U.S. application Ser. No. 289,193 filed Sept. 14, 1972 now U.S. Pat. No. 3,758,705 is disclosed a method of preparing such coaxially conducting element, which are coaxial in sense of having substantially parallel axes, by the controlled crystallization of conducting crystalline dendrites orientated along an axis of the element and growing through an insulating glassy or glass-ceramic matrix. The crystalline conductors produced by this process are randomly distributed in a substantially parallel array. This approach obviates the problems associated with handling and physically installing several thousand conductors into a single insulating matrix.

In some applications it is desirable to modify this random conductor array to define registration between conductor terminal on opposing surfaces of the matrix. The present invention provides for such definition of registration as well as eliminating the migration of charge or "cross-talk" between conductors.

Accordingly, it is a primary object of the present invention to provide an efficient and practical conductive element comprising a substantially parallel array of mutually insulated electrical conductors passing through an insulating matrix, said conductor being arranged in bundles between conductive caps on opposing surfaces of said insulating matrix. A further object is to remove or "erase" terminal points of individual conductors from the surface of the matrix in areas not covered by the conductive end caps.

Co-pending U.S. application Ser. No. 289,193 filed Sept. 14, 1972 now U.S. Pat. No. 3,758,705 discloses forming a molten mass of thermally crystallizable glass composition comprising silica, at least one alkaline earth oxide, and titania, removing gaseous materials from said molten mass under non-oxidizing conditions (i.e., reducing or neutral conditions) cooling a first cross-sectional portion of said molten mass to establish a temperature gradient in said molten mass, and selectively crystalline an array of discrete, conductive needle-like dendrites of titanium oxide or dendrites of stuffed titanium oxide represented by the structural formula $Ti_xO_{2x-1}$ wherein x is an integer of at least one, cooling cross-sectional portions of said molten mass adjoining said first cross-sectional portion to advance the temperature gradient throughout said mass thereby crystallizing said dendrites in a substantially parallel array with said dendrites being axially aligned in the direction of said temperature gradient, and cooling the resulting mass to form an insulating matrix around said array of conductive dendrites. The term dendrites of stuffed titanium oxide has been used above and refers to dendrites of titanium oxide having a crystalline structure which is stablized with inclusions of matrix constituents. The resulting body is then formed into the desired configuration by conventional glass and ceramic forming techniques such as cutting, drawing, grinding and so on, to form the desired element. The terminal points of individual conductive dendrites are exposed on surfaces of the element to establish electrical conductivity through the dendrites. For convenience in reference the titanium oxides represented by the formula $Ti_xO_{2x-1}$ wherein $x$ is an integer of at least one will be hereinafter called "reduced rutile."

The present invention further processes the element of Ser. No. 289,193 now U.S. Pat. No. 3,758,705 by depositing a pattern of paired conductive caps on opposing surfaces of said matrix so that each pair of such caps is in electrical contact with corresponding terminal points of a plurality of individual conductive dendrites to define a bundle of conductive dendrites between each pair of caps.

In a preferred practice of the present invention, the element equipped with such conductive caps is subjected to an oxidizing treatment (such as a chemical oxidizing agent or an oxidizing atmosphere) at a temperature and for a time sufficient to oxidize exposed terminal points of dendrites in the matrix surface areas which are not covered by the conductive caps to the non-conductive state. This technique further electrically isolates the conductive caps to prevent electrical charge migration or "cross-talk" between the conductor bundles defined by the pairs of caps.

In yet another preferred practice of the present invention, a network of grounding shields are disposed on the surfaces of the matrix surround the conductive caps and electrically isolate the caps from each other. These grounding shields are employed in addition to or as a replacement for the oxidation process.

Figure 2:
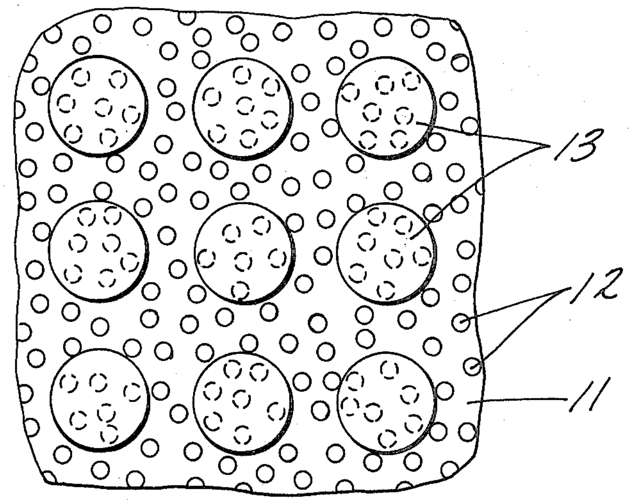
Figure 3:
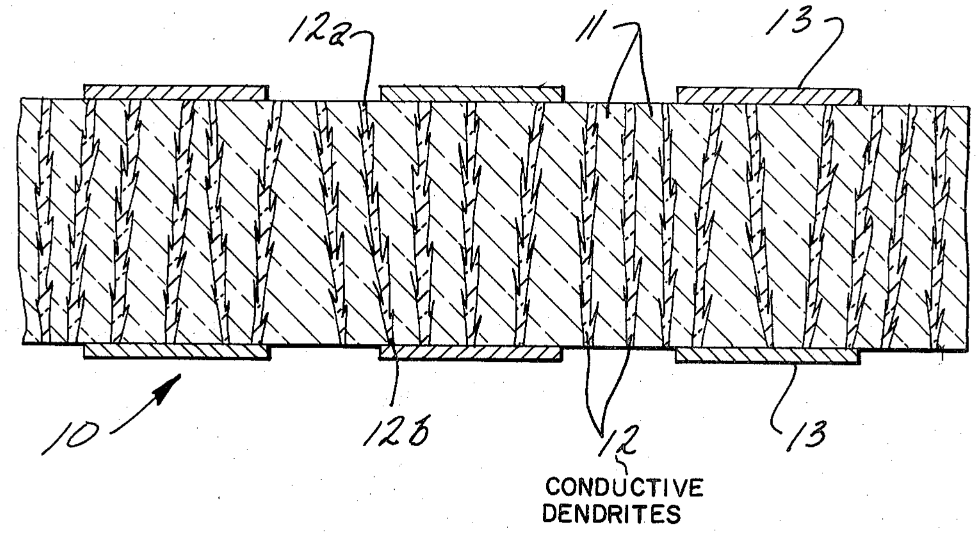
Figure 4:
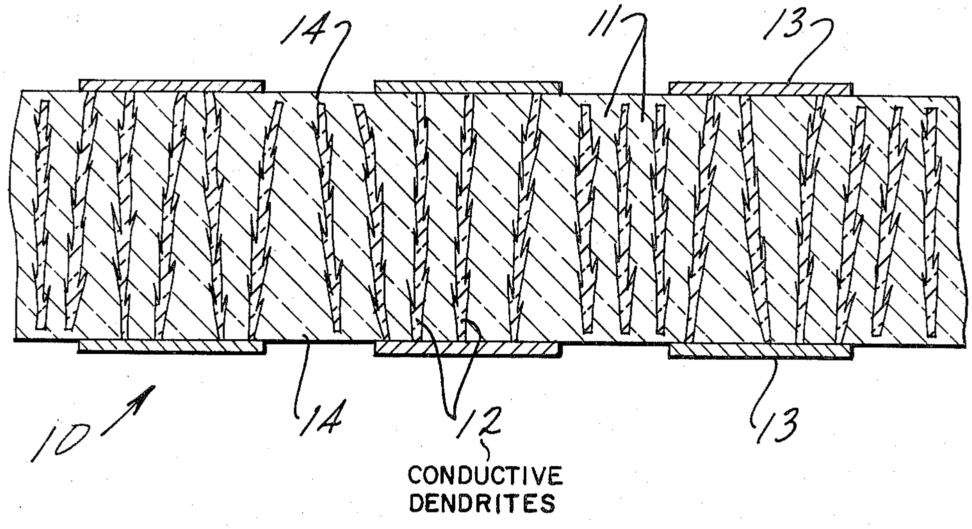
Figure 5:
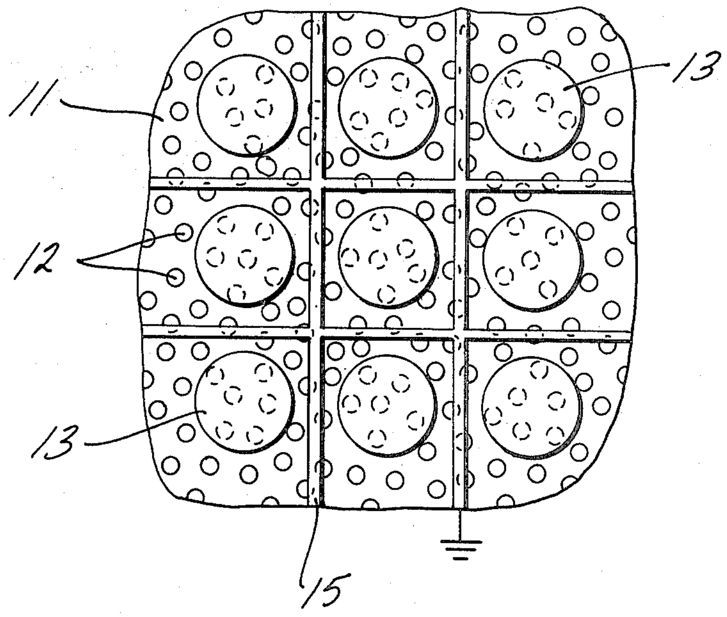

In the drawings, which will be discussed in relation to the examples, FIG. 1 is a partial sectional view of a conductive element having conductive caps according to the present invention; FIG. 2 is a broken-away top view of the element of FIG. 1; FIG. 3 is a partial sectional view of a conductive element of invention; FIg. 4 is a view of the cross-section like that of FIG. 3 except that exposed terminal points of dendrites at the matrix surface have been oxidized to the non-conductive state; and FIG. 5 is a broken-away top view like FIG. 2 of an element equipped with a network of grounding shields.

Compositions suitable for practicing the present invention consist essentially of alkaline earth-titania-silicate within the weight range of about:

| | Broad (%) | Preferred $CaO-TiO_2-SiO_2$ Compositions (%) | Preferred $MgO-TiO_2-SiO_2$ Compositions (%) |
|---|---|---|---|
| $SiO_2$ | 25–60 | 25–50 | 30–60 |
| $TiO_2$ | 10–40 | 20–40 | 10–35 |
| CaO | 0–30 | 10–25 | — |
| MgO | 0–30 | — | 10–30 |
| Wherein MgO+CaO | 10–30 | | |
| $Al_2O_3$ | 0–30 | 0–30 | 0–30 |
| $B_2O_3$ | 0–15 | 0–10 | 0–10 |

Other conventional glass forming ingredients such as $Na_2O$, $K_2O$, $P_2O_5$, ZnO, PbO, and BaO can be added if desired in combined proportion of up to about 10 percent by weight of the above composition so long as such addition does not prevent the formation of the reduced rutile phase.

In the preferred $CaO-TiO_2-SiO_2$ system, reduced rutile and sphene can exist as the crystalline phases. Due to the mechanics of crystallization, reduced rutile will always form as conductive needle-like dendrites while the non-conductive sphene (if it crystallizes at all) will crystallize in the matrix. Whether or not sphene crystallizes in the matrix is of no importance to the present invention because the matrix is non-conductive in either case. For some applications it may be desirable to have a glassy matrix and for these applications the crystallization conditions will be selected to avoid the formation of sphene. When a glass-ceramic matrix is desired, the crystallization conditions will be selected to promote this formation of sphene in the matrix.

The batch compositions can be selected from conventional fritted or unfritted glass making materials such as feldspar, oxides, carbonates, aluminates and so forth. Impurities can also enter the compositions, depending on the source of starting materials provided they do not adversely affect the desired properties of the final element.

In preparing the melt, the batch material are placed in a refractory container and brought to a temperature where the molten state is achieved. For most of the compositions described above this temperature is about 1,400°C–1,600°C. When the conductive element to be formed must be vacuum tight, the prevention of the formation of bubbles during crystallization of the reduced rutile phase is of great importance. The source of these bubbles appears to be the release of gases dissolved or occluded in the melt during the normal process of melting the glass. This results in the formation of an elongated bubbles in the vicinity of the reduced rutile dendrite.

The present invention provides for minimizing the formation of such elongated bubbles by out-gassing the melt. One of these out-gassing methods is vacuum melting wherein the entire melt is processed under a total pressure of less than 1mm of Hg or less and often as low as $10^{-3}$mm of Hg. While this method is efficient, it requires specialized vacuuming melting equipment. Accordingly, other methods such as purging or sparging the melt with an inert gas such as nitrogen, argon, neon or carbon dioxide can be employed. This sparging can be accomplished by bubbling the purging gas through this melt or by employing a batch material which releases a purging gas upon decomposition during melting. Carbonates as raw materials release carbon dioxide during melting which has the effect of purging the melt and sweeping away dissolved and occluded gaseous components. The amount of purging required varies from application to application. In most applications the melt should be purged so that no visible bubbles are observed by visually examining the finished element with the naked eye.

In the inert gas sparging technique the inert gas is bubbled through the melt at a temperature sufficiently far above the melting temperature that the glass is fluid enough so that a reasonable rate of gas flow through the melt can be achieved, while at the same time the bubbles formed are sufficiently small to have a high ratio of surface to volume. Both of these factors are functions of melt viscosity. It has been found that sufficient outgassing to practically eliminate the formation of bubbles and voids from the finish element can be achieved by bubbling argon gas through the melt at the rate of about 0.1 to 0.5 SCFH at a temperature of about 1,400–1,500°C for a period of 3½ hours for melts having a volume of about 10 cubic inches.

In the preparation of electrically conducting elements according to the present invention a glass composition as described above is melted in an essentially neutral atmosphere or a reducing atmosphere. Thereafter the desired article is shaped and crystallized while still in the same atmosphere.

The effect of the neutral or reducing atmosphere is to reduce some of the potentially conductive titania present in the composition to the lower member of the homologous series $Ti_xO_{2x-1}$ where $x$ is an integer with a value of at least one (i.e., reduced rutile). This provides the mixture of valence states in the titanium which is necessary to achieve electrical conductivity.

Many crystalline species other than the reduced rutile species can be present in the resultant element in addition to the reduced rutile without materially effecting the conductivity characteristics.

Example of neutral and reducing atmospheres for use in this invention are argon, argon-hydrogen, nitrogen, nitrogen-hydrogen, carbon monoxide, and nitrogen-oxygen gas mixtures. These atmospheres function to form reduced rutile phase by the exclusion of the required amount of oxygen necessary to convert all of the titanium compounds present to $TiO_2$.

In another embodiment invention a metal or reducing agent is added to the melt in an amount sufficient to reduce the titanium oxide present to the conductive reduced rutile state. Suitable reducing agents for this purpose include carbon and titanium titanium-oxide. Carbon (i.e., graphite) melting vessels are often employed in which case the reducing agent is available by reaction of the melt with its containing vessel.

The heat treatment required to crystallize the reduced rutile dendrites is more complicated than is usually encountered in crystallization processes. A first cross-sectional portion of the melt, after it has been purged to remove dissolved and occluded gases and while still in a neutral or reducing atmosphere, is cooled so as to initiate the crystallization of reduced rutile dendrites therein while maintaining the balance of the melt at a temperature above the crystallization temperature of reduced rutile. The cross section portion so cooled is essentially planar in cross-sectional area so that reduced rutile dendrites are randomly crystallized throughout the cross-sectional portion rather that at a point as a "ball of dendrites." For most compositions described above, this crystallization temperature is in the range of about 1,050°C to 1,150°C.

Once the reduced rutile dendrites have been randomly crystallized throughout the first cross-sectional portion, cross-sectional portions adjoining the first cross-sectional portions are cooled to within the crystallizing temperature range to cause the dendrites to grow through scan adjoining cross sectional portions. This process is repeated until the dendrites have achieved the desired length at which time the resulting mass is cooled to form an insulating glass or glass-ceramic matrix around the array of conductive dendrites.

The technique of advancing a planar temperature gradient through the melt usually forms a substantially parallel array of conductive dendrites of reduced rutile is an insulating matrix having the following characteristics:

1.

a conductive dendrite distribution of at lest about 50,000 per sq. in. although conductive dendrites of 200,000 to 3,000,000 per square inch are not uncommon, with about 1,000,000 per square inch being typical;

2.

a conductive dendrite diameter in the ange of about 0.1 to 1.5 mil;

3.

a conductive dendrite resistance of about 300 to 1,000 ohms per linear inch;

4.

essentially all of the dendrites in parallel alignment;

5.

matrix resistivity of at least about $10^{10}$ ohm-cm;

6.

essentially void free elements;

7.

high mechanical strength.

The element thus formed is useful for many applications, but in some instances more perfect registration between the terminal points of dendrites or opposing matrix surfaces and elimination of electrical "cross-talk" is critical. To achieve such registration, a pattern of paired conductive caps are deposited on opposing surface of said matrix such that each pair of caps is in electrical contact with corresponding terminal points of a plurality of individual conductive dendrites to define a bundle of conductive dendrites between each of said pair of caps.

The composition of the electrically conductive caps is not critical although metals such as silver chromium, copper, platinum, gold, nickel, tin and lead are usually used for efficiency and economy. The metal caps can be deposited by several known processed including in-situ decomposition of compounds such as metal carbonyls, chemical vapor deposition (known in the art as CVD), vacuum deposition of vaporized metals, cathode sputtering, silk screening of metallic pastes and paints, electrodeposition or any of the methods disclosed in U.S. Pat. No. 3,195,219, the disclosure of which is incorporated by reference.

The thickness of the conductive metal caps is not critical and is usually in the range of 0.1 mil to about 5 mils. In most applications a thickness of about 0.1 mil to about 1 mil is quite satisfactory.

The size of the individual caps depends upon the application involved and the size of the matrix and the number of individual dendrites that are to be bonded together to form a conductor bundle between each pair of opposing caps. This is easily determined by those skilled in the art. For instance, assume that the matrix has a random conductive dendrite distribution of 1,000,000 per in$^2$. It is known that offset printing methods have an optical resolution of about 140 lines per inch. To achieve this resolution in the matrix, about 9 conductive dendrites are enclosed under each cap with a pattern of about 16 "uncapped" dendrites surrounding each of such caps. This is based upon a pattern of 3 mil diameter caps on 5 mil centerline-to-centerline spacing. The uncovered dendrites can then be rendered non-conductive by oxidation as discussed below.

In one application technique, a first surface of the matrix of conductive dendrites is covered with a conductive silver paste. Metal caps such as nickel or copper are selectively electrodeposited on the terminal points of dendrites on second (opposing) surfaces of the matrix using the conductive dendrites to complete the electrodeposition circuit through the matrix. The silver paste is then removed from the first surface and the metal caps are used to selectively electrodeposit corresponding caps on the first surface.

The uncovered terminal points of dendrites in areas between the caps can be oxidized to the non-conductive state by the oxidation treatment disclosed in U.S. Pat. No. 3,484,258. Such an oxidation treatment can be carried out at elevated temperatures of 600°–800°C. or higher in air for a period ranging from about 2 hours to 8 days. During this oxidation step, the temperature should not exceed the temperature at which phase changes occur which are detrimental to performance. The oxidation treatment oxidizes the conductive dendrites of reduced rutile at the matrix surface to convert them to a non-conductive state of rutile.

In some cases when less noble metals are employed, it may be necessary to shield the conductive caps during oxidation to prevent this oxidation to a non-conductive form.

In addition to, or as a replacement for the oxidation treatment, a network of grounding shields can be employed to electrically isolate the conductive caps by preventing charge migration. Such network of grounding shields can be of the same material as the conductive caps applied by the methods employed in depositing the caps.

The present invention will be illustrated in the following examples wherein all parts are by weight, all percentages are weight percentages and all temperatures are in °C unless stated otherwise.

EXAMPLE 1

Part A

The following batch materials are placed in a refractory crucible:

| | |
|---|---|
| Titania | 23 parts |
| Silica | 37.2 parts |
| Alumina | 7.5 parts |
| Calcium Carbonate | 32 parts |
| Aluminum | 0.5 parts (reducing agent) |

The charged crucible is placed in a furnace and the temperature is raised to 1,350°C while the contents of the crucible are melted and stirred. During this melting procedure, a forming gas (10 percent hydrogen--90 percent nitrogen) atmosphere is maintained in the furnace. After melting for four hours under the above conditions, a homogeneous molten mass of approximately 1 inch in thickness is achieved. The prolonged heating effectively removes the gaseous materials from the melt. The composition of the molten mass is:

| | Mole % | Weight % |
|---|---|---|
| $SiO_2$ | 47.5 | 43.2 |
| $TiO_2$ | 22.0 | 26.8 |
| CaO | 24.5 | 20.8 |
| $Al_2O_3$ | 6 | 9.2 |

At the end of this four hour period, a stream of forming gas at room temperature is directed against the bottom of the crucible to establish a thermal gradient of about 60°C from top to bottom of the molten mass. Thus, the temperature at the top of the molten mass is about 1,350°C while the temperature at the bottom of the molten mass is about 1,290°C. The cooling with forming gas is continued over a 5 hour period to maintain the 60°C temperature gradient from top to bottom while gradually lowering the bottom temperature of the mass to about 980°C and the top temperature of the melt to about 1,040°C. This thermal treatment results in the nucleation and growth of an array of axially aligned, conductive dendrites of reduced rutile in a glass-ceramic matrix containing sphene as the crystalline phase.

The element thus formed is then held at 1,250°F for about 10 hours to anneal and remove strains. After this annealing period sample is cooled to room temperature over a 24 hour period while the forming gas atmosphere is maintained in the furnace.

The element thus is removed from the crucible and the top and bottom faces are ground and polished to clearly expose the dendrites. The ground and polished faces are observed to contain conductive, black, reduced rutile dendrites in the proportion of about 700,000 to 1,000,000 dendrites per square inch.

About 80–90 percent of the dendrites are in a parallel array and axially aligned from bottom to top of the element. The dendrites are about 1 mil in diameter and are spaced at about 1.5 mils center line to center line. About 30 percent of the element comprises conductive dendrites and the remaining 70 percent comprised the insulating glass-ceramic matrix. The dendrites have a resistance of about 500 to 1,000 ohms as determined by placing the leads of the ohmmeter on terminal points of the individual dendrites on opposing faces of the element. The element has a flat disc-like configuration with the dendrites passing through the two faces of the disc.

Part B

A "double salt" nickel electroplating bath is prepared by dissolving 4.8 parts of nickel sulfate, 0.6 parts of ammonium sulfate and 0.6 parts of boric acid in 40 parts of distilled water.

A non-conductive masking stencil which is impervious to the above electroplating bath and having cutout circular portions 10 mils in diameter spaced at 30 mils center-to-center spacing is applied to one face of the element prepared in Part A. The surface fitted with the stencil is then fitted with a shallow retaining rim so that the face of the element simulates the bottom of the dish.

A silver electrode is applied to the opposing face of the element by brushing on a conductive silver-based paint. The "dished" side of the element is filled with the electroplating bath prepared above, the silver electrode is wired as a cathode in an electroplating circuit, and a current of 30 milliamps is passed through the bath. This corresponds to a current density of approximately 10 amps per square foot. The electroplating operation is continued until the circular portions of the element face exposed through the stencil are completely covered by nickel plating.

The electroplating bath is then removed from the element and the silver electrode is removed by washing with acetone. The element is then cleaned by washing in successive baths of alcohol and distilled water. A pattern of conductive circular nickel caps 10 mils in diameter is present on the face of the element. The caps are about 0.1 to 0.5 mils in thickness.

A silver electrode is then applied over the face having the nickel caps thereon, and the opposite face of the element is fitted with a non-conductive masking stencil like the one used above so that the 10 mil holes are in registry with the pattern of nickel caps. The masked face of the element is fitted with a retaining rim and the electroplating technique described above is repeated so as to form a corresponding set of nickel caps in registry on each face of the element. The nickel caps thus formed are in electrical contact with the terminal ends of the dendrites thereunder and define a bundle of such dendrites.

The element thus formed is designated generally by reference number 10 in FIGS. 1 and 3. In these Figures, as well as the other Figures, the insulating matrix is designated by reference numeral 11 and the conductive dendrites of reduced rutile are designated by number 12. The conductive nickel caps which define a bundle of conductive dendrites therebetween are designated by number 13. The element is suitable for use in transmitting electronic information or can be further processed as follows.

The element is then placed in an oven at 600°C for 26 hours in an air atmosphere to oxidize the exposed dendrite terminals at surface areas on element 10 which are not covered by caps 13. After the oxidation treatment, the dendrite terminals on the surface of element 10 have been oxidized from the surface as represented generally by number 14 in FIG. 4.

In FIG. 3, dendrite terminal 12*a* is shown to be uncovered by the cap 13 while dendrite terminal 12*b* is shown to be covered by the corresponding cap on the opposite face of the element because of a slight misalignment. FIG. 4 illustrates how this relatively small misalignment of conductive dendrites can be corrected and conductivity confined between the caps 13 by the oxidizing treatment according to the present invention.

After oxidation as described above, the uncovered dendrite terminal 12*a* in FIG. 3 is oxidized to the non-conductive state as designated generally by number 14 in FIG. 4. The element is then tested for electrical isolation of individual bundles between the caps 13 by impressing a voltage varying between ½ and 100 volts on corresponding caps 13 on opposite faces of the element. No conductivity between adjacent conductive caps is observed.

Substantially similar results are obtained by using any of the elements produced in Examples 1, 2 or 3 of U.S. application Ser. No. 289,193 now U.S. Pat. No. 3,758,705 in the above procedures.

EXAMPLE 2

One face of the element prepared in Part A of Example 1 is fitted with a stencil mask having 50 mil diameter holes at 150 mils center-to-center spacing. The opposite face of the element is then fitted with a corresponding stencil mask so that the holes are in registration. The masked element is then placed in a bell jar vacuum deposition apparatus. The bell jar apparatus is then evacuated to a pressure of $10^{-6}$ mm of mercury while metallic gold is vaporized from an electrically heated tungsten coil within the bell jar. The vaporized gold deposits on both faces of the element in a pattern of dots or caps defined by the stencil mask and vapor deposition is continued until the patterned areas are filled with conductive gold dots.

A temporary protective coating of silver paint is applied over the gold dots before removal of the stencil mask. The element is then heated in an air atmosphere at 600°C for 26 hours to oxidize the dendrite terminals from the surface area of the element which is not covered by the gold dots. After heat treatment, the silver paint is removed and the resulting element is essentially as shown in FIG. 4. Any dendrites which may have been slightly misaligned and not covered by the gold caps are oxidized to the non-conductive state.

EXAMPLE 3

Part A

A masking stencil with cutout circular holes 50 mils in diameter at 150 mil spacing is applied with the holes in registry onto both faces of the element of Part A of Example 1. The masked element is then spray painted on both sides with a conductive silver paint. The paint is then dried and the stencil mask is removed. The resulting element is essentially as shown in FIG. 3 and is suitable for use in transmitting electronic information.

Part B

A masking stencil having cutout portions corresponding to the grid network 15 of FIG. 5 is applied to the element of Part A of Example 3. A conductive silver paint is then applied over the masking stencil to deposit the conductor grid network 15 of FIG. 5. The stencil is then removed and the grid network 15 in FIG. 5 is connected to ground. Electrical testing indicates that the grounded grid network 15 electrically isolates adjacent caps 13 by preventing charge migration therebetween.

Having thus described the invention, what is claimed is:

1. In the method for forming an electrically conductive element comprising a substantially parallel array of mutually insulated, crystalline conductors through an insulating matrix, wherein a thermally crystallizable glass composition consisting essentially of:

| | |
|---|---|
| $SiO_2$ | 25–60% by weight |
| $TiO_2$ | 10–40% |
| CaO | 0–30% |
| MgO | 0–30% |
| wherein MgO+CaO | 10–30% |
| $Al_2O_3$ | 0–30% |
| $B_2O_3$ | 0–15% |

is selectively crystallized to yield an array of discrete conductive dendrites of reduced rutile through an insulating matrix, the improvement comprising;

exposing terminal points of individual conductive dendrites on opposing surfaces of said matrix to establish electrical conductivity through said dendrites, depositing a pattern of paired conductive caps on said opposing surfaces of said matrix, each pair of said caps being in electrical contact with corresponding terminal points of a plurality of individual conductive dendrites to define a bundle of conductive dendrites between each of said pair of caps.

2. The method of claim 1 further including the step of oxidizing the matrix surface which is not covered by said caps to the non-conductive state.

3. The method of claim 1 wherein adjacent caps are electrically isolated from each other by a network of electrically conductive grounding shields.

4. The method of claim 1 wherein said crystallizable composition consists essentially of:

| | |
|---|---|
| $SiO_2$ | 25–50% by weight |
| $TiO_2$ | 20–40% |
| MgO | 10–25% |
| $Al_2O_3$ | 0–30% |
| $B_2O_3$ | 0–10% |

5. The method of claim 1 wherein said crystallizable composition consists essentially of:

| | |
|---|---|
| $SiO_2$ | 30–60% |
| $TiO_2$ | 10–35 |
| CaO | 10–30 |
| $Al_2O_3$ | 0–30 |
| $B_2O_3$ | 0–30 |

6. The method of claim 1 wherein the resulting matrix is glass-ceramic.

7. The method of claim 1 wherein the resulting matrix is glassy.

8. An electrically conductive element comprising a substantially parallel array of discrete, conductive, crystalline dendrites of reduced rutile embedded in and passing through an insulating matrix, said dendrites terminating on opposing surfaces of said matrix, the improvement wherein a pattern of paired conductive caps is positioned on each of said opposing surfaces of said matrix, said caps being in electrical contact with corresponding terminal points of a plurality of individual conductive dendrites to define a bundle of conductive dendrites between each of said pair of caps.

9. The electrically conductive element of claim 8 wherein adjacent caps are electrically isolated from each other by a network of electrically conductive grounding shields.

10. The element of claim 8 wherein the distribution of dendrites is at least about 50,000 per square inch.

11. The element of claim 8 wherein the diameter of said dendrites are in the range of about 0.1 to about 1.5 mil.

12. The element of claim 8 wherein the resistance of said dendrites is in the range of about 300 to about 1,000 ohms per linear inch.

13. The element of claim 8 wherein the resistivity of the matrix is at least about $10^{10}$ ohm-cm.

14. An electrically conductive element comprising a substantially parallel array of discrete, conductive, crystalline dendrites of reduced rutile embedded in an insulating matrix, said matrix having a pattern of paired conductive caps positioned on opposing surfaces thereof, said caps being in electrical contact with corresponding terminal points of a plurality of individual conductive dendrites to define a bundle of conductive dendrites through said matrix between each of said pair of caps, wherein the matrix surface which is not covered by said caps is free from said conductive dendrites.

* * * * *